(12) United States Patent
Fong et al.

(10) Patent No.: US 11,171,832 B2
(45) Date of Patent: Nov. 9, 2021

(54) DYNAMIC CLOUD NATIVE CLUSTER CONSTRUCTION USING UNDER-UTILIZED MACHINES

(71) Applicant: EMC IP Holding Company LLC, Hopkinton, MA (US)

(72) Inventors: Victor Fong, Medford, MA (US); Xuebin He, Westwood, MA (US); Megan Murawski, Belmont, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/776,152

(22) Filed: Jan. 29, 2020

(65) Prior Publication Data

US 2021/0234755 A1 Jul. 29, 2021

(51) Int. Cl.
*G06F 15/173* (2006.01)
*H04L 12/24* (2006.01)
*H04L 29/08* (2006.01)

(52) U.S. Cl.
CPC .......... *H04L 41/0816* (2013.01); *H04L 67/10* (2013.01)

(58) Field of Classification Search
CPC . H04L 41/0816; H04L 67/10; H04L 41/0853; H04L 41/0833
See application file for complete search history.

(56) References Cited

U.S. PATENT DOCUMENTS

| | | | |
|---|---|---|---|
| 10,725,803 B1* | 7/2020 | Zhu | G06F 9/455 |
| 2012/0284709 A1* | 11/2012 | Lorenc | G06F 9/455 718/1 |
| 2016/0204923 A1* | 7/2016 | Ashok | H04L 67/10 709/226 |
| 2016/0247178 A1* | 8/2016 | Gujar | H04L 41/5003 |

\* cited by examiner

*Primary Examiner* — Anh Nguyen
(74) *Attorney, Agent, or Firm* — Workman Nydegger (57) ABSTRACT

One example method includes connecting to a server component, transmitting, to the server component, information concerning a hardware configuration associated with an asset having a capability that is fully utilized during a first time period and the capability is idle during a second time period, receiving, from the server component, cluster connection information, and using the cluster connection information to temporarily connect the asset to the cluster as a node of the cluster so that the capability is available during idle time to perform a workload of the cluster.

19 Claims, 4 Drawing Sheets

DYNAMIC CLOUD NATIVE CLUSTER CONSTRUCTION USING UNDER-UTILIZED MACHINES

FIELD OF THE INVENTION

Embodiments of the present invention generally relate to utilization of the available capacity of idle systems and machines. More particularly, at least some embodiments of the invention relate to systems, hardware, software, computer-readable media, and methods for a software-defined platform to obtain telemetry, identify under-utilized machines, and create user-defined or automated policies to orchestrate these machines to join a cloud native cluster during off-hours.

BACKGROUND

As enterprises progress in their digital transformation journey and continuously innovate to define new digital experiences for end-users, the demand for infrastructure continuously increases to support new workloads. These workloads might be for development, testing, or production. While it may be possible to acquire new hardware, or utilize public cloud services, to support these additional workloads, such approaches may introduce significant costs and/or complexity to the computing environment.

Moreover, many enterprises may not be fully utilizing the computing systems/devices, computing capacity, and computing capabilities, that are already in their possession and available. To illustrate, one example of such a computing device may be a desktop machine that sits idle while employees are away from work. The idle time for a typical workplace computing device has been estimated to be as high as 76.1%, which assumes a 40 hour employee work week, but does not consider vacations or other time off. Another example of a system/machine that experiences idle time is a server that operates with a reduced workload during off-hours.

Idle time may be particularly concerning where the under-utilized asset is a powerful, and expensive, system or device which, if better utilized, could make a significant contribution to the operations of an enterprise. Presently, however, there is a lack of effective ways to utilize these assets when they are idle.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Example embodiments of the invention generally relate to utilization of the available capacity of idle systems and machines in a computing environment.

At least some particular embodiments of the invention relate to systems, hardware, software, computer-readable media, and methods, for a software-defined platform to obtain telemetry, identify under-utilized machines, and create user-defined or automated policies to orchestrate these machines to join a cloud native cluster during off-hours. When a node of a virtualized cluster, such as vSphere for example, is under-utilized, a mechanism may be provided to create a virtual machine (VM) that can then join the cloud native cluster. The VM may constitute a virtualization, or abstraction, of hardware and/or software components, including applications, of one or more underutilized asset(s). In addition to, or instead of, VMs, one or more bare metal machines may be employed.

Based on the respective characteristic of different VMs, a pre-defined set of labels, which need not be of any particular form, can be added to describe their capabilities and locations (for example, "gpu" (graphics processing unit), "Quadro P2000" (such as the Nvidia Quadro P2000), or "cambridge"). Once the VM(s) join a cloud native cluster that includes a cluster manager, such as Kubernetes for example, a cluster scheduler would be responsible to orchestrate workloads on those VMs to fully utilize, or at least better utilize, the respective available resources of the VMs. The cloud native cluster may, for example, use containers to perform the needed workloads, and the number and type of containers may be scaled up or down as needed.

Thus, embodiments of the invention may, among other things, enable enterprises to better leverage their existing under-utilized assets. This may reduce, or eliminate, the need to burst operations out to a public cloud computing environment, which may instead be employed as a secondary option, thereby saving the cost and effort that would be needed to set up a hybrid strategy involving both enterprise assets and public cloud computing assets.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that available capacity of idle assets may be employed so as to improve the effectiveness and efficiency of operations in a computing environment, without necessitating the purchase, implementation, and maintenance, of additional hardware and/or software. An embodiment of the invention may reduce, or eliminate, the need to implement a hybrid strategy to perform enterprise computing operations, where such a hybrid strategy, which may be expensive and complex, may require the use of both enterprise assets, and public cloud computing assets.

A. Overview

Following is a discussion of some scenarios that may be resolved, or avoided, by one or more embodiments of the invention, although it is not required that any embodiment provide such results. As noted earlier, one circumstance that may arise in a computing environment is that a computing entity, or asset, is not being fully utilized when the user is away from work, on vacation, or taking breaks. Computing entities are becoming much more capable, and some even configured with accelerators to run Machine Learning (ML) workloads. Instead of being used to run workloads for other purposes for the company however, these machines are often allowed to sit idle, or shut down, when the user is not actively using it. Due to a lack of insight into the availability of these resources, and instead of trying to increase the utilization of assets they already possess, enterprises may look instead to acquiring more hardware or expanding into the public cloud, which leads to unnecessary cost. Thus, insofar as embodiments of the invention may enable the identification, and use, of available computing assets, such embodiments may avoid, or prevent, circumstances such as those just described.

As another example, embodiments of the invention may predict which asset will be idle or under-utilized. Such predictions may be based, for example, on historical data, employee schedule, user pattern, and/or other considerations. In this way, such example embodiments may be able to identify available computing assets, possibly in advance of when those assets may be needed.

Further, example embodiments of the invention may provide mechanisms that enable an asset, determined or predicted to be available, to join, at least temporarily, a cloud-native cluster, or other computing environment. This functionality may be implemented automatically. Thus, available assets, once identified, may be quickly and efficiently deployed until they are no longer needed.

Finally, embodiments of the invention may enable assets to not only dynamically join a cloud-native cluster or other environment on an as-available and as-needed basis, but such embodiments may also enable each of such assets to be managed on an individual asset basis. In this way, deployment of available assets may be made on a relatively granular basis, and thus such assets are amenable to orchestration processes.

B. Aspects of an Example Architecture and Environment

Following is a discussion of aspects of some example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, any one or more of the disclosed processes, methods, and operations. Examples of such operations may include, but are not limited to, data read/write/delete operations, data deduplication operations, data backup operations, data restore operations, data cloning operations, data archiving operations, and disaster recovery operations. More generally, the scope of the invention embraces any operating environment, and associated operations, in which the disclosed concepts may be useful, and the scope of the invention is not limited to data protection operations.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics. Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage. In addition to the storage environment, the operating environment may also include one or more clients that are capable of collecting, modifying, and creating, data. As such, a particular client may employ, or otherwise be associated with, one or more instances of each of one or more applications that perform such operations with respect to data.

As well, and more generally, example embodiments may be employed in any cloud-native cluster environment, or other cluster environments which may, or may not, be cloud environments. Such other cluster environments may, or may not, comprise, or consist of, an on-premises computing environment, for example.

Devices in the operating environment may take the form of software, hardware, physical machines, or virtual machines (VM), or any combination of these, though no particular device implementation or configuration is required for any embodiment. Similarly, components such as processors, memory devices, storage devices, databases, storage servers, storage volumes (LUNs), storage disks, replication services, backup servers, restore servers, backup clients, and restore clients, for example, may likewise take the form of software, physical machines with various hardware components, or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

Embodiments of the invention may employ, such as in a cloud-native cluster environment for example, one or more containers. In general, a container may comprise an entire runtime environment. One example of such a runtime environment may include one or more applications, as well as dependencies of those applications, libraries, and any configuration files needed to run the applications. These elements may all be bundled together in a single entity or package that runs in a cloud-native cluster, or other computing environment. Because the application platform and its dependencies are containerized, differences in OS distributions and underlying infrastructure, for example, may be abstracted away.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Various other terms may likewise be employed herein. For example, as used herein, a 'bare metal' machine embraces, but is not limited to, any computing asset, which may comprise hardware or may be a VM, that does not include an operating system (OS). Thus, operations may be executed by a bare metal machine directly on logic hardware of that bare metal machine.

As another example, as 'asset' as used herein embraces, but is not limited to, any computing entity, whether physical and/or virtual, capable of performing one or more computing operations. Such computing entities may generate, and/or cause the generation of, new and/or modified data. Such new and/or modified data may, but need not necessarily, be generated by one or more applications. Examples of assets include, but are not limited to, (i) a computing entity that comprises hardware and/or software, (ii) a bare-metal machine that comprises hardware and/or software but does not have an installed operating system (OS), and (iii) representations and abstractions of a computing entity that includes hardware and/or software, where one example of such an abstraction is a virtual machine (VM) that comprises a virtualization of one or more hardware components, and/or software components, of the computing entity.

The term 'edge station' embraces, but is not limited to, one or more machines that offer compute and/or storage services. An 'end device' embraces, but is not limited to, a client of a service provided by an edge-station. Thus, some example end devices include smart phones, Internet of Things (IoT) devices, laptops, and tablets. An 'edge-station service provider' embraces, but is not limited to, entities that set up edge-stations as a service, where such entities may include cloud service providers, restaurants and other public sites, transportation companies, and government. Finally, 'cloud' embraces, but is not limited to, any remote location capable of hosting one or more workloads.

Figure 1:
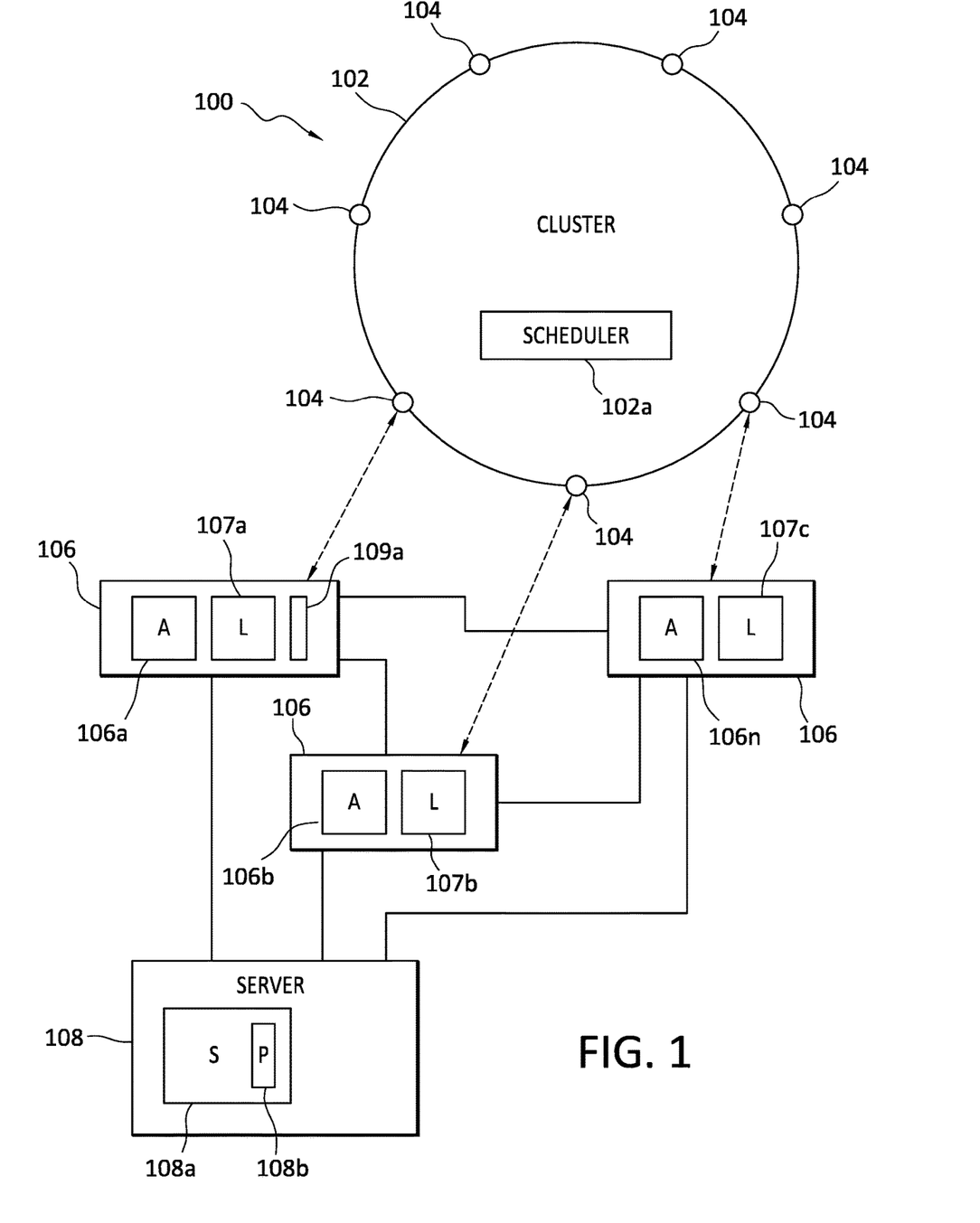
FIG. 1 discloses aspects of an example operating environment.

With particular attention now to FIG. 1, one example of an operating environment for embodiments of the invention is denoted generally at 100. In general, the operating environment 100 may include a cluster 102, such as a cloud-native cluster, one example of which is a virtualized cluster such as vSphere, or Open Stack, for example. The cluster 102 may comprise one or more nodes 104 that may be able to communicate with each other, such as by way of a network or other mechanism for example. As discussed in more detail below, one or more of the nodes 104 may be dynamic, or transient, in the sense that such nodes may persist as nodes of the cluster 102 only for a finite, rather than indefinite, period of time. As well, the cluster 102 may comprise a cluster scheduler 102a that orchestrates performance of workloads by the various nodes 104, based at least in part on characteristics of the assets 106 that respectively correspond to those nodes 104.

As just noted, the example operating environment 100 also comprises one or more assets 106 that may communicate with each other, such as by way of a network or other mechanism for example. One or more of the assets 106 may host a respective instance of an agent component 106a, 106b, and 106n. In general, the agent component may be installed on any asset that may potentially serve, at least temporarily, as a node 104 of the cluster 102. The possibly temporary function of an asset 106 as a node 104 of the cluster 102 is indicated by the dotted lines running between the assets 106 and respective nodes 104 of the cluster 102.

With continued reference to FIG. 1, the example operating environment 100 may also include a server 108 that communicates with the assets 106. The server 108 may include a server component 108a that interacts with one or more of the agent components 106a, 106b, and 106n. In general, the server component 108a may take the form of a remote, software-defined component that may, for example, collect telemetry from the agent components 106a, 106b, and 106n and other data sources, create dynamic schedules for each agent component 106a, 106b, and 106n, and allow operators to define policies. The server component 108a may include a policy engine 108b that enables a user to add/modify/delete one or more policies, such as by way of a user interface (UI) capable of accepting user input. Further information concerning some example policies is provided elsewhere herein.

The installation of the agent components 106a, 106b, and 106n may be as simple as embedding an instance of the executable of the agent components 106a, 106b, and 106n in the respective machine images of each asset 106, where such assets 106 may take the form of, for example, a desktop computing system, or a bare-metal machine. In some embodiments, installation of the agent components 106a, 106b, and 106n may be automated. The agent may be described differently for nodes already in a virtualized cluster, such as vSphere or Open Stack. As to the server component 108a, it may, in some embodiments, only need to be installed only once, and each agent component 106a, 106b, and 106n, regardless of location, may thus be connected to a single server component 108a, forming a one (server component)-to-many (agent components) configuration in this example.

B. Operational Aspects of Some Example Embodiments

TELEMETRY. With continued reference to FIG. 1, further details are provided now concerning various operational aspects of some embodiments of the invention. As noted earlier, the server component 108a may employ telemetry to obtain information from one or more of the agent components 106a, 106, and 106n. In more detail, for example, when agent component 106a first comes online, the agent component 106a may establish a communication connection with the server component. Over time, the agent component 106a would perform a telemetry process which may comprise collecting runtime data concerning the asset 106 that hosts the agent component 106a. Data collected as part of a telemetry process may be referred to herein as telemetry data and may include, for example, user logs, CPU, RAM, and the number of processes supportable, for example. The agent component 106a may then transmit the collected telemetry data to the server component 108a.

The collection of telemetry data may be optional, inasmuch as a purpose of the telemetry data is to be used for creating, and/or modifying, automated policies and real-time decision-making as to whether or not to join the cluster 102. Thus, if one or more policies already exist, the collection of telemetry data by the agent component 106a may not be needed, and such collection may be turned off or otherwise disabled. In some embodiments, a copy of the collected telemetry data may be stored at the asset 106, although that is not required.

POLICIES. As noted above, one or more policies may be defined and implemented in some embodiments of the invention. In general, one or more policies may be defined for the servers, such as the server 108 for example, to control when an asset 106 should be joining a cluster 102, such as a cloud-native cluster for example. One or more of such policies may be user/operator-defined, or automatically generated. Each policy may specify at least two pieces of information, namely, an identifier of the asset 106, and the timeslot throughout which that asset 106 will, and/or may be available to, serve as a node 104 of the cluster 102. More generally, any policy may specify any dimensions and/or rules desired by a user, and the scope of the invention is not limited to the example policies disclosed herein.

Through the use of such policies, a cluster scheduler 102a may be able to determine, among other things (i) which assets 106 are available for performance of a cluster 102 workload, and (ii) when those assets 106 are/will be available. With the policy information, and label information as disclosed elsewhere herein, the cluster scheduler 102a may generate and implement workload schedules for one or more of the nodes 104 to which the assets 106 respectively correspond.

For example, depending on the implementation of the policy-engine 108b of the server component 108a, additional dimensions and rules can be included such as, for example, "leave cluster when user logs on desktop" or "do not join cluster if there is less than 60% of free RAM." Based on the setting of one or more agent components, such as agent component 106a for example, one or more policies may be defined for a group of assets 106. For example, a multi-asset policy may be "all machines in this office should join cluster after 7 pm EST." As another example, a policy may include multiple conditions such as " . . . all machines (i) with >70% free RAM should (ii) join the cluster after 2 am." In this example, as well, it may not be known until the conditions are checked whether or not multiple assets are covered by the policy. Thus, this policy is open-ended in terms of the number of assets to which it ultimately applies. As another example, a policy may specify "join the cluster at 10 pm and leave the cluster at 5 am." As these examples thus illustrate, policies may embody any one or more of a variety of characteristics, examples of which are: (i) policies may be conditional; (ii) policies may be open-ended; (iii) policies may apply to only a single asset; (iv) policies may apply to multiple assets; (v) policies may specify one or more particular timeslots during which an asset, or assets, may be available as nodes of a cluster.

Policies may be defined automatically, as well as by a user. For example, policies may be generated automatically based on telemetry data. In order to generate such policies, the server component may predict the timeslots of when an asset is under-utilized. Depending on the implementation, this prediction may be made by a machine-learning model (ML) trained by historical data, time-series telemetry of the asset and other input sources, such as a user calendar for example. The machine learning process may be supervised, or unsupervised. By way of illustration, a simple timeslot prediction algorithm may calculate a simple average of when, for a defined time period such as the last 30 days, a user is not logged in on an asset. By knowing the time period(s) during which, typically, the user is not logged in on the asset, a prediction may be made as to when that asset will be available for use as a node of a cluster.

JOINING A CLUSTER. The following discussion refers to an asset 106, cluster 102, asset component 106a, and server 108. However, those elements are referred to only by way of example, and are not limiting of the scope of the invention. Based on one or more policies, the server component 108a may wake up when a specified timeslot begins and connect to the agent component 106a for example, that is running on the asset 106 associated with the policy. After connection with the agent component 106a, the server component 108a may then transmit connection information and credentials to the agent component 106a to enable the asset 106 to join the cluster 102 as a node 104.

Depending on the use-case and implementation, the mechanism of joining a cluster, such as cluster 102 for example, may vary from one case to another, and may vary on an asset-by-asset basis in some cases. For example, on bare-metal (BM) machines, the agent component 106a may join a cluster 102, such as a cloud-native cluster, by invoking software and/or information 109a already installed on the asset 106. In the case of Kubernetes for example, this process may be as simple as the agent component 106a invoking 'kubeadm' using information sent to the asset 106 by the server 108.

In some embodiments, the agent component 106a may also be configured to create a VM within the asset 106, if the operating system of the asset 106 does not match with the need of the cluster 102. For example, if the asset 106 is running Windows, but the cluster 102 expects Linux runtime, the agent component 106a may create a Linux VM with a pre-defined VM image, which may be an element of software/information 109a, that was installed in the Windows asset 106 at installation time. At runtime, when joining a cluster 102 such as a cloud-native cluster for example, the Linux VM, rather than a Windows VM, would join the cluster 102.

The agent component 106a may also provide the 102 cluster with information about one or more characteristics of the asset 106 such as, for example, memory size, number of cores, CPU type, GPU type, and time(s) of availability or non-availability of the asset 106 for performing tasks as a node 104 of the cluster 102. In some embodiments, this information may be self-discovered by the agent component 106a which may survey, on its own initiative or in response to a command, the asset 106 to obtain the asset 106 characteristics. The information obtained from the survey may then be transformed by the agent component 106a into one or more pre-defined labels 107, such as labels 107a, 107b, and 107c for example, that are then associated with the asset 106. Additionally, or alternatively, an operator may define one or more labels 107a, 107b, 107c, manually during the installation of hardware and/or software on the asset 106. Using these labels 107a, 107b, and 107c, which may be transmitted by the agent component 106a to the cluster scheduler 102a, the cluster scheduler may then parse the labels 107a, 107b, and 107c, and assign workloads to best utilize the respective available capabilities of the assets 106, as obtained from the parsing of the labels 107a, 107b, and 107c. For example, if an asset 106 such as desktop machine has a GPU, a "has-gpu" label may be assigned to that asset 106 at the cluster 102. The cluster scheduler 102a may then match workloads that need a GPU, such as an ML algorithm for example, to be executed on the asset 106.

In some embodiments, an asset 106 operating within a virtualized cluster, such as vSphere for example, may join the cluster 102, which may be a cloud-native cluster for example. In this case, the server 108 may create a VM running on the asset 106, so that the VM would be joining the cloud-native cluster, inside of the actual bare-metal machine, that is, the asset 106. Depending upon considerations such as the use-case and implementation, for example, different mechanisms may be used to create this VM. For example, in the case of vSphere, the server component 108 may invoke an agent component 106a, such as vCenter for example, to create a VM on the asset 106, where the VM is configured with the asset 106 resources that are available, or will be, for use by the cluster 102.

The asset 106 image used to create the VM may be created according to requirements of the cluster 102. For example, if the cluster 102 is a cloud-native cluster based on Kubernetes, then the asset image that the VM is based on should have Docker, 'kubelet' and 'kubeadm' already installed. In addition, the agent component 106a may also be embedded inside the asset image that is used to create the VM. After the VM is up and running, the server component 108a may orchestrate the agent component 106a that is running within the VM, to join the cluster 102. For example, in the case of Kubernetes, the agent component 106a in the VM may simply invoke 'kubeadm,' using the information sent by the server component, 108a to join the VM to the cluster 102, which may be a Kubernetes cluster in this example. Finally, and as noted elsewhere herein, after a VM has joined a cloud-native cluster, the scheduling of workload and networking of each container may be managed by the cluster scheduler 102a.

LEAVING A CLUSTER. In some embodiments at least, each policy defines, or is otherwise associated with, a respective timeslot. When the timeslot finishes, the server component 108a may wake up and connect to the agent component 106a on the asset 106 with which the policy is associated. After receiving instruction from the server component 108a, the agent component 106a may invoke software/information 109a already installed on the asset 106 to leave the cluster 102. Depending on the cluster 102 type and configuration for example, this mechanism may be different. In a Kubernetes cluster for example, the agent component 106a would invoke 'kubeadm,' which may already have been installed as software/information 109a on the asset 106, to leave the cluster 102.

After invoking the software/information 109a, any workload running on the node 104 corresponding to the asset 106 would need to be drained and moved elsewhere, such as to one or more other nodes 104 for example. For example, depending on the drain policy of the cluster 102, such workload could be live-migrated to another node 104, or a new VM instance could be created in another node 104, or the workload could be scaled down. Where the workload has completed prior to the asset 106 leaving the cluster 102, no workload migration may be needed. After the asset 106 has detached from the cluster 102, the cluster 102 may update its records to indicate that the node 104 corresponding to that asset 106 is no longer available to take on a workload.

Finally, and as noted herein, various processes may involve (i) accessing information resident on an asset 106, and/or (ii) invocation of software resident on an asset 106. This information and/or software are collectively denoted at 109a in FIG. 1. Such processes may include, but are not limited to, VM creation, joining a cluster, and leaving a cluster. The information/software 109a may reside at any one or more of the assets 106.

Figure 2:
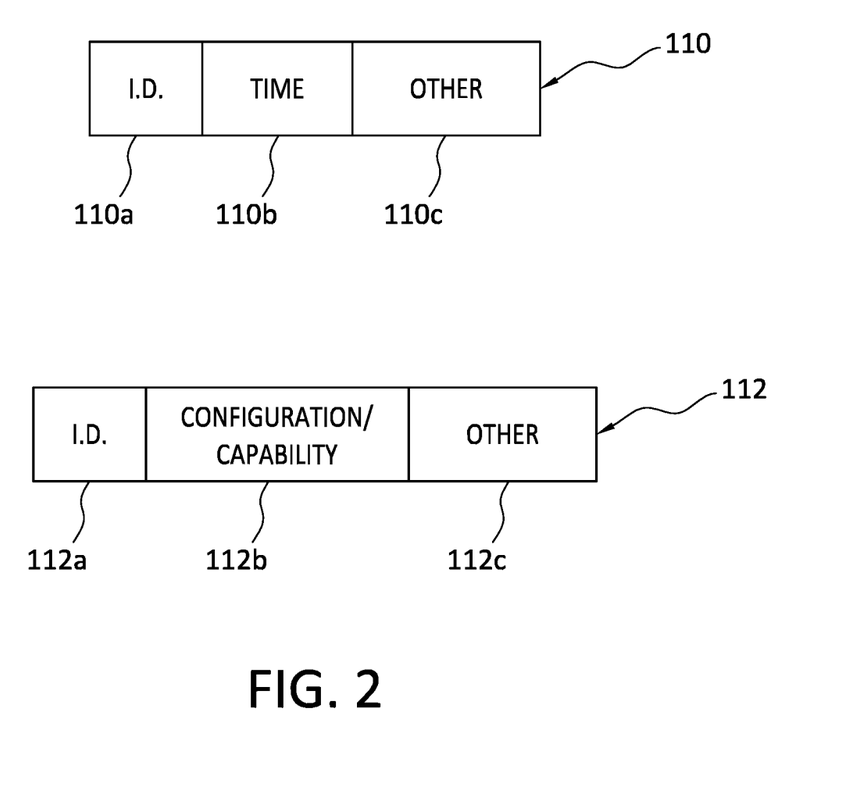
FIG. 2 discloses aspects of an example policy, and example label.

With reference now to FIG. 2, an example policy 110 and label 112 are disclosed. In the illustrated example, the policy 110 may include an I.D. 110a that uniquely identifies a particular asset 106, or possibly a group of assets 106. The policy 110 may also include a Time 110b that indicates one or more time periods during which the asset 106 to which the policy 110 applies is available to execute a cluster 102 workload. Finally, the policy 110 may include any Other policy information 110c, examples of which are disclosed elsewhere herein. As indicated in the example of FIG. 2, the label 112 may include an I.D. 112a, which may uniquely identify a particular asset 106, or possibly a group of assets 106. The label 112 may also include information indicating the configuration and/or capability 112b of the asset 106 to which the label 112 corresponds. Finally, the label 112 may include any Other label information 112x, examples of which are disclosed elsewhere herein.

D. Example Methods

Figure 3:
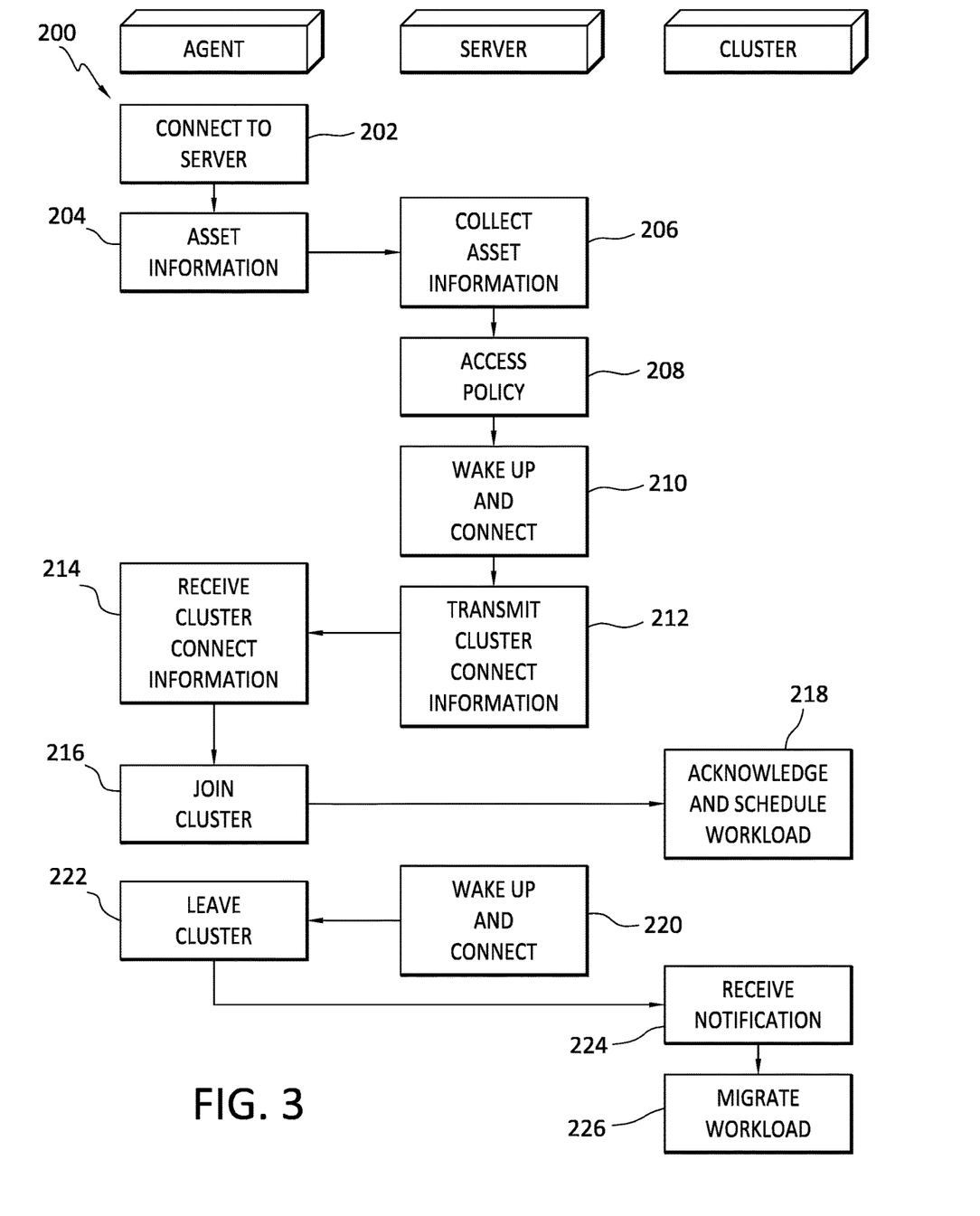
FIG. 3 discloses aspects of some example methods.

With reference next to FIG. 3, details are provided concerning some methods for enabling an asset to join/leave a cluster environment, where one example method is denoted generally at 200. In general, the asset may be an asset that is underutilized by virtue of having one or more capabilities, such as processing for example, that experience one or more idle periods, that is, periods when those capabilities are not being used fully, or at all. Because such capabilities are idle for at least part of the time, they may be usefully applied to other workloads at least during idle periods, so that the capabilities of the underutilized asset are more fully employed than would otherwise be the case.

The method 200 may begin when an agent component, hosted at an asset such as a computing system, connects 202 with a server component. The agent component may then transmit 204, and the server component obtain 206, information concerning the asset. The asset information may comprise, for example, runtime telemetry gathered by the agent component.

Next, the server component may access 208 one or more policies concerning the asset. The access process 208 may embrace a variety of different processes. For example, the server component may automatically generate one or more policies based on the information received at 206. As another example, if one or more policies already exist, such as one or more user-defined policies for example, there may be no need for the server component to generate additional policies and, as such, the processes 204 and 206 may be omitted.

Based on the policy, or policies, the server component may then wake up 210 when a timeslot specified in a policy begins. As part of the process 210, the server component may then connect to the agent component and transmit 212 cluster connection information which is then received 214 by the agent component. Using the connection information received 214 from the server component, the agent component may then take action to join 216 the asset to the cluster.

At 218, the cluster may acknowledge the connection of the asset as a node of the cluster, and then schedule one or more workloads for the new node. Scheduling of the workloads may involve, for example, parsing one or more labels and/or one or more policies associated with the asset, and then generating a workload schedule based on information in the labels and/or policies. One or more of the scheduled workloads can then be run at the new node.

After a time period corresponding to a timeslot specified in a policy has run, the server component may wake up and connect to the agent component, notifying 220 the agent component that the time period has run. After receipt of the notification 220, the agent component may then detach the asset from the cluster 222. This detachment may simply comprise the asset leaving the cluster. The cluster may accordingly receive 224 a notification that the asset has left the cluster. Any unfinished workloads that had been assigned to the node corresponding to the asset may then be migrated 226 by the cluster to another node, or nodes, of the cluster.

In some embodiments, detachment of the asset from the cluster 222 may be delayed, even if the time period specified in a policy has run. Thus, a policy requirement may be overridden in some cases, such as when a process executing on a node cannot be readily interrupted or stopped. Whether or not a policy requirement may be overridden may additionally, or alternatively, be a function of the relative importance of the asset in its usual operating environment. For example, a policy concerning a relatively more important asset may not be overridden, while a policy concerning a relatively less important asset may be overridden in some circumstances.

E. Useful Aspects of Example Embodiments

Following is a discussion of various useful aspects that may be implemented by one or more example embodiments. These are provided only by way of example, and it is not required that any embodiment implement any of these aspects.

In general, for example, one or more embodiments may utilize desktop and/or bare-metal machines during idle times by joining a cloud-native cluster and executing workloads assigned by the cluster. Embodiments of the invention may define and employ a dynamic mechanism to predict timeslots of when assets may be under-utilized. Thus, an enterprise employing an embodiment of the invention may better leverage these under-utilized assets to execute workloads, instead of acquiring additional hardware or bursting out to public clouds. Thus, this approach may reduce costs for the enterprise, without compromising performance.

Embodiments of the invention may provide a mechanism to create a VM on an under-utilized asset within a virtual cluster. Thus, such embodiments may enable assets within a virtualized cluster (like vSphere) to be better utilized.

Further, global enterprises may possess servers and bare-metal machines located all around the globe. Off-hours at one location may be peak hours at another location. Embodiments of the invention may enable peak-hour workloads to be orchestrated to off-hour locations, better utilizing idle infrastructure and cutting costs.

Embodiments of the invention may provide additional flexibility by empowering users, or operators, to define and use dynamic policies that may control when to utilize under-utilized machines. In this way, operators may define policies to control single machines or groups of machines, adding flexibility to the configuration and operation of a computing environment.

As another example, embodiments of the invention may provide an automated mechanism to auto-generate one or more policies by utilizing telemetry from one or more assets. Thus, such embodiments may function out-of-the-box, without necessitating any user-defined policy, after observing for a period of time, such as a week for example, or by inputting a schedule provided by the owner of the asset. The observing process may be performed, for example, as part of a machine learning process, although that is not necessarily required.

Embodiments of the invention may provide a mechanism to make special characteristics and hardware profile of an asset known to the cluster, through the use of labels. For example, an asset with GPU may be assigned a "has-gpu" label and registered at the cluster level. Thus, a cluster scheduler may assign workloads to these assets in such a way as to better, or best, utilize the idle hardware and/or idle software of the asset.

As a final example, embodiments of the invention may enable under-utilized machines with different operating systems to join cloud-native clusters. More specifically, some embodiments may provide a mechanism to create VMs on under-utilized machines, so that the VMs, rather than the bare-metal machines, would be joining the cloud-native clusters. This approach enables under-utilized desktop machines and bare-metal servers to join a cloud-native cluster regardless of the operating system installed on the desktop machines. It also empowers machines from within a virtualized cluster, such as vSphere or Open Stack for example, to join a cloud-native cluster during off-hours.

F. Example Use Cases

Following is a discussion of some example use cases for one or more example embodiments. It is noted however, that none of the embodiments are required to be employed as discussed in these illustrative use cases.

Some embodiments may be implemented as a software-defined computation platform used by data science teams. While data science teams typically have GPU on their desktops, few would share resources across-individual or even across-teams. For example, an enterprise might have five data science teams, with each team member owning a desktop. However, it may be unlikely that each team member and each team would be doing computation at night and weekend all the times. Furthermore, when team members go on vacation, it may be uncommon for other team members to utilize the idle machine, as setup and manual orchestration would take too long. Furthermore, off-season for one team might be peak-season for another. For example, one data science team could be making prediction of product sales during Black Friday, so the team would be utilizing significant computing resources prior to Black Friday. However, another team might be analyzing sales data from Black Friday, so that team may utilize significant computing resources after black-Friday. To address circumstances such as these, embodiments of the invention may provide a resource pool that includes the idle machines. Thus, when one team or one team member is not utilizing their desktop machines, for example, other teams may utilize the idle machines instead of bursting computing workloads out to the cloud or requesting additional IT resources. In this way, embodiments of the invention may provide for more efficient utilization of idle hardware and/or idle software, thus improving business productivity, and cutting costs.

As a final example, embodiments of the invention may be implemented as a software-defined global burst computing platform. For example, global enterprises may have hardware and/or software located at a variety of geographical locations all over the globe. Off hour in one location may be peak hour in another location. Depending on the particular application implementation, such as credit card processing, emailing, calculation, or training, for example, an immediate response time may not always be needed by those processes. Thus embodiments of the invention may enable assets that are under-utilized during off-hours, such as assets located in the Western US, to be used to handle additional workloads from another location, such as India for example, so as to possible avoid a public cloud burst, and thus reduce costs.

G. Further Example Embodiments

Following are some further example embodiments of the invention. These are presented only by way of example and are not intended to limit the scope of the invention in any way.

Embodiment 1. A method comprising: connecting to a server component; transmitting, to the server component, information concerning a hardware configuration associated with an asset having a capability that is fully utilized during a first time period and the capability is idle during a second time period; receiving, from the server component, cluster connection information; and using the cluster connection information to temporarily connect the asset to the cluster as a node of the cluster so that the capability is available during idle time to perform a workload of the cluster.

Embodiment 2. The method as recited in embodiment 1, wherein the cluster is a cloud-native cluster.

Embodiment 3. The method as recited in any of embodiments 1-2, wherein the cluster is a virtualized cluster Embodiment 4. The method as recited in any of embodiments 1-3, wherein the capability concerns hardware and/or software of the asset.

Embodiment 5. The method as recited in any of embodiments 1-4, wherein the asset comprises a VM that represents one or more hardware components of an associated computing entity.

Embodiment 6. The method as recited in any of embodiments 1-5, wherein a particular time when the asset joins the cluster as a node of the cluster is based on a policy.

Embodiment 7. The method as recited in any of embodiments 1-6, wherein the operations further comprise associating a label with the asset, and the label includes information about the capability of the asset.

Embodiment 8. The method as recited in any of embodiments 1-7, wherein the operations further comprise detaching the asset from the cluster.

Embodiment 9. The method as recited in any of embodiments 1-8, wherein the asset joins and leaves the cluster in response to a communication from a server component.

Embodiment 10. The method as recited in any of embodiments 1-9, wherein the operations further comprise running, on the asset, a cluster workload.

Embodiment 11. The method as recited in any of embodiments 1-10, wherein the information transmitted to the server component comprises runtime telemetry concerning the asset and collected by an agent component associated with the asset.

Embodiment 12. The method as recited in any of embodiments 1-11, wherein the operations are performed by an agent component associated with the asset.

Embodiment 13. A method comprising: receiving, from an agent component associated with an asset, information concerning a hardware configuration associated with the asset; accessing a policy concerning the asset; connecting to the agent component based on the policy; and transmitting cluster connection information to the agent component, and the cluster connection information is usable by the agent component to connect the asset to a cluster.

Embodiment 14. The method as recited in embodiment 13, wherein a server component connects to the agent component at a time specified in the policy.

Embodiment 15. The method as recited in any of embodiments 13-14, wherein the operations are performed by a server component.

Embodiment 16. The method as recited in any of embodiments 13-15, wherein the operations further comprise generating the policy based on the information received from the agent component.

Embodiment 17. The method as recited in any of embodiments 13-16, wherein the operations further comprise notifying the agent component that a time period specified in the policy has ended.

Embodiment 18. The method as recited in any of embodiments 13-17, wherein the policy specifies (i) a unique identifier of the asset, and (ii) a timeslot during which the asset is available to execute a cluster workload.

Embodiment 19. The method as recited in any of embodiments 13-18, wherein the cluster is a virtualized cluster, and the operations further comprise the server component notifying the agent component to create a VM based on the asset.

Embodiment 20. The method as recited in any of embodiments 13-19, wherein the cluster is a cloud-native cluster.

Embodiment 21. A method for performing any of the operations, methods, or processes, or any portion of any of these, disclosed herein.

Embodiment 22. A non-transitory storage medium having stored therein instructions that are executable by one or more hardware processors to perform the operations of any one or more of embodiments 1 through 21.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
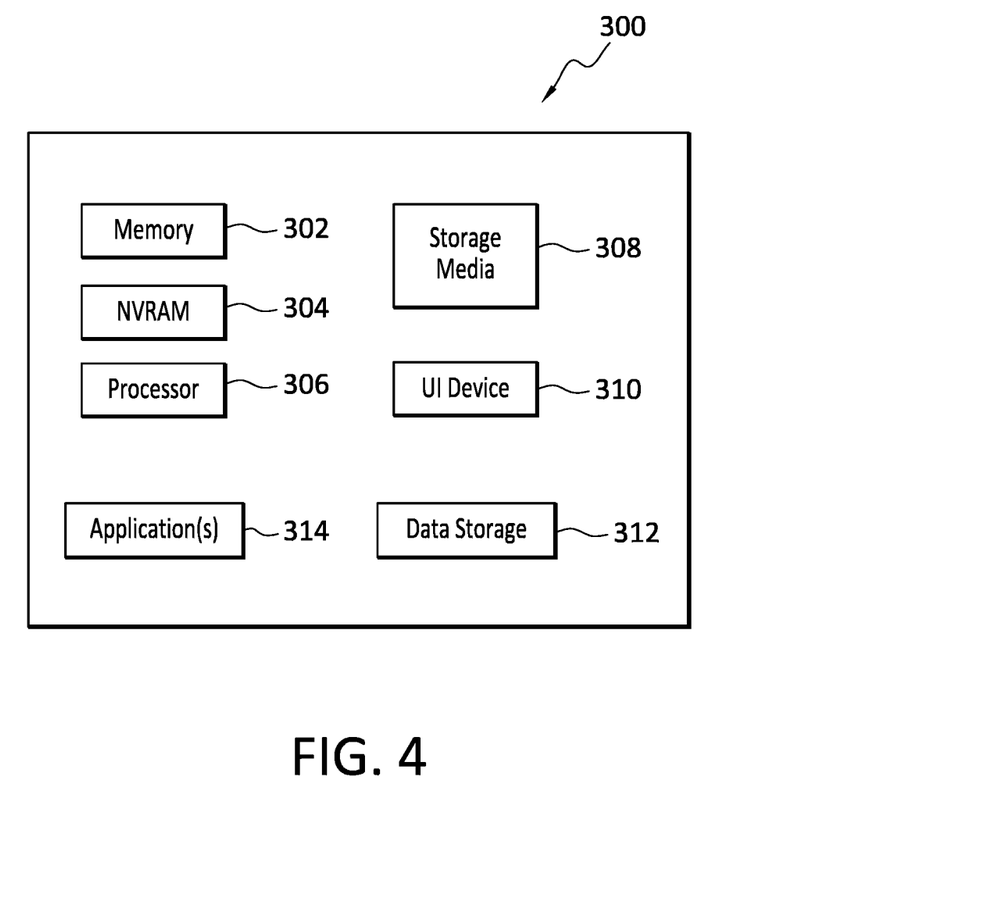
FIG. 4 discloses aspects of an example computing entity.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 4.

In the example of FIG. 4, the physical computing device 300 includes a memory 302 which may include one, some, or all, of random access memory (RAM), non-volatile random access memory (NVRAM) 304, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the methods, processes, operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions that are executable by one or more hardware processors to perform operations comprising:
   connecting, by an asset, to a server component, and the asset has an associated label that includes information about a capability of the asset;
   transmitting, by the asset to the server component, information concerning a hardware and/or software configuration of the asset, wherein the capability of the asset, provided by the hardware and/or software configuration, is fully utilized during a first time period and the capability is idle during a second time period;
   receiving by the asset, from the server component, cluster connection information usable by the asset to connect to a cluster;
   using, by the asset, the cluster connection information to temporarily connect the asset to the cluster as a node of the cluster so that the capability is available during idle time to perform a workload of the cluster; and
   creating, by an agent component hosted by an agent, a virtual machine (VM) having a VM operating system, wherein the VM is created within the asset when an operating system of the asset does not match with a need of the cluster.

2. The non-transitory storage medium as recited in claim 1, wherein the cluster is a cloud-native cluster.

3. The non-transitory storage medium as recited in claim 1, wherein the cluster is a virtualized cluster.

4. The non-transitory storage medium as recited in claim 1, wherein the VM is configured to implement the asset capability.

5. The non-transitory storage medium as recited in claim 1, wherein the VM that represents one or more hardware components of an associated computing entity.

6. The non-transitory storage medium as recited in claim 1, wherein a particular time when the asset joins the cluster as the node of the cluster is based on a policy implemented and maintained by the server component.

7. The non-transitory storage medium as recited in claim 1, wherein the operations further comprise detaching the asset from the cluster.

8. The non-transitory storage medium as recited in claim 1, wherein the asset joins and leaves the cluster in response to a communication from the server component.

9. The non-transitory storage medium as recited in claim 1, wherein the operations further comprise running, on the asset, a cluster workload.

10. The non-transitory storage medium as recited in claim 1, wherein the information transmitted to the server component comprises runtime telemetry concerning the asset and collected by the agent component associated with the asset.

11. The non-transitory storage medium as recited in claim 1, wherein the operations are performed by the agent component associated with the asset.

12. A method, comprising operations of:
connecting, by an asset, to a server component, and the asset has an associated label that includes information about a capability of the asset;
transmitting, by the asset to the server component, information concerning a hardware and/or software configuration of the asset, wherein the capability of the asset, provided by the hardware and/or software configuration, is fully utilized during a first time period and the capability is idle during a second time period;
receiving by the asset, from the server component, cluster connection information usable by the asset to connect to a cluster;
using, by the asset, the cluster connection information to temporarily connect the asset to the cluster as a node of the cluster so that the capability is available during idle time to perform a workload of the cluster; and
creating, by an agent component hosted by an agent, a virtual machine (VM) having a VM operating system, wherein the VM is created within the asset when an operating system of the asset does not match with a need of the cluster.

13. The method as recited in claim 12, wherein the cluster is a cloud-native cluster.

14. The method as recited in claim 12, wherein the asset comprises a VM that represents one or more hardware components of an associated computing entity.

15. The method as recited in claim 12, wherein a particular time when the asset joins the cluster as the node of the cluster is based on a policy implemented and maintained by the server component.

16. The method as recited in claim 12, wherein the operations further comprise detaching the asset from the cluster.

17. The method as recited in claim 12, wherein the asset joins and leaves the cluster in response to a communication from a server component.

18. The method as recited in claim 12, wherein the operations further comprise running, on the asset, a cluster workload.

19. The method as recited in claim 12, wherein the information transmitted to the server component comprises runtime telemetry concerning the asset and collected by the agent component associated with the asset.

* * * * *